(12) United States Patent
Ouyang

(10) Patent No.: US 9,900,937 B2
(45) Date of Patent: Feb. 20, 2018

(54) CONSTANT-CURRENT CONSTANT-VOLTAGE (CCCV) CONTROL UNIT POWER SUPPLY

(71) Applicant: NOBLE CORPORATION, Zhong Shan (CN)

(72) Inventor: Shu Rong Ouyang, Zong Shan (CN)

(73) Assignee: Gardenia Industrial Limited (VG)

( * ) Notice: Subject to any disclaimer, the term of this patent is extended or adjusted under 35 U.S.C. 154(b) by 0 days.

(21) Appl. No.: 15/249,016

(22) Filed: Aug. 26, 2016

(65) Prior Publication Data
US 2018/0007749 A1    Jan. 4, 2018

(30) Foreign Application Priority Data

Jun. 29, 2016   (CN) .................... 2016 2 0682507 U

(51) Int. Cl.
*H05B 33/08*    (2006.01)
*H02M 7/04*    (2006.01)
*H02M 1/44*    (2007.01)

(52) U.S. Cl.
CPC .......... *H05B 33/0809* (2013.01); *H02M 1/44* (2013.01); *H02M 7/04* (2013.01)

(58) Field of Classification Search
CPC ........ H05B 33/0809; H02M 1/44; H02M 7/04
USPC ...................................... 315/200 R
See application file for complete search history.

(56) References Cited

U.S. PATENT DOCUMENTS

| | | | |
|---|---|---|---|
| 2013/0099686 A1* | 4/2013 | Ge ..................... | H05B 33/0827 315/186 |
| 2014/0191659 A1* | 7/2014 | Wu .................... | H05B 33/0812 315/53 |
| 2014/0300274 A1* | 10/2014 | Acatrinei .......... | H05B 33/0815 315/85 |
| 2016/0098046 A1* | 4/2016 | Jutras ................ | H05B 33/0851 320/107 |
| 2016/0270184 A1* | 9/2016 | Xiong ............... | H05B 33/0887 |

\* cited by examiner

*Primary Examiner* — Dylan White
(74) *Attorney, Agent, or Firm* — Lewis Roca Rothgerber Christie LLP

(57) ABSTRACT

A power supply including: an AC input power connector; an AC-DC converter circuit coupled to the AC input power connector; a constant-current constant-voltage control unit configured to receive DC power from the AC-DC converter circuit; a light emitting diode (LED) lamp unit configured to receive power from the constant-current constant-voltage control unit; and a capacitor coupled in parallel with the LED lamp unit.

11 Claims, 5 Drawing Sheets

CONSTANT-CURRENT CONSTANT-VOLTAGE (CCCV) CONTROL UNIT POWER SUPPLY

CROSS-REFERENCE TO RELATED APPLICATION(S)

This application claims priority to and the benefit of Chinese Patent Application No. 201620682507.4, filed in the State Intellectual Property Office of the People's Republic of China on Jun. 29, 2016, the entire disclosure of which is incorporated herein by reference.

FIELD

Aspects of embodiments of the present invention relate to the field of light emitting diode lamp power supplies.

BACKGROUND

In the current market, there is a desire for high efficiency light emitting diode (LED) lighting systems that include power supplies having high power factor (PF). However, this high power factor is typically achieved at the expense of basic lighting quality because, while high power factor lighting supplies may operate at high efficiency, this may also result in flicker of the LED lamps. In addition, driving circuitry to drive the LED lamps at low power, such as 3 Watts to 5 Watts (3 W-5 W) is generally not compatible with typical light dimmers available on the market.

SUMMARY

Some embodiments of the present invention are directed to a light emitting diode (LED) lamp power supply having high power factor, simple design, and low cost, while also reducing or avoiding a flicker problem.

Some embodiments of the present invention are also directed to a power supply capable of driving high power LED lamps, while also avoiding problems associated with typical high-efficiency power supplies designed for LED lamps.

To achieve the above object, aspects of embodiments of the present invention include:

A power supply including: an AC input power connector; an AC-DC converter circuit coupled to the AC input power connector; a constant-current constant-voltage control unit configured to receive DC power from the AC-DC converter circuit; a light emitting diode (LED) lamp unit configured to receive power from the constant-current constant-voltage control unit; and a capacitor coupled in parallel with the LED lamp unit.

The capacitor may be an electrolytic capacitor.

The capacitor may have a capacitance value between 33 µF and 68 µF.

The power supply may further include a second constant-current constant-voltage control unit configured to receive DC power from the AC-DC converter circuit and configured to supply power to the LED lamp unit in parallel with the constant-current constant-voltage control unit.

The power supply may further include an anti-electromagnetic interference circuit coupled between the AC input power connector and the AC-DC converter circuit.

The anti-electromagnetic interference circuit may be an EMC or EMI circuit.

The constant-current constant-voltage control unit may include a constant-current constant-voltage control integrated circuit and a peripheral circuit.

The AC input power connector may be connected to grid power.

The power supply may further include a protection circuit between the AC input power connector and the AC-DC converter circuit, the protection circuit including: a fuse connected in series between the AC input power connector and the AC-DC converter circuit; and a voltage dependent resistor connected between two input terminals of the AC input power connector.

The LED lamp unit may include a plurality of strings of LEDs in parallel, each of the strings of LEDs including a plurality of LEDs coupled in series.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

Some embodiments of the present invention have the following characteristics:

1) The use of an electrolytic capacitor in parallel with the LED lamps is a low cost, easy to implement modification that can be used with a power supply for LED lamps having power factor (PF) value greater than 0.9 with a low flickering rate of 30% or less.

2) The use of two constant-current constant-voltage control units in parallel, which allows an increase in the output power, thereby increasing the driving power of LED lights, such as LED lights driven at 12 W.

3) The use of two constant-current constant-voltage control unit in parallel also allows the use of higher capacitance values in parallel with the LED lamp unit. For example, the capacitance of the capacitor or capacitors in parallel with the LED lamp unit may be in the range of 33 µF to 68 µF, which can further reduce flickering.

4) anti-electromagnetic interference (EMI) and protection circuits may be coupled between the AC input power and the AC-DC converter. The protective circuit may include a fuse and a voltage dependent resistor, where the voltage dependent resistor is connected across the two input terminals of the AC input power, and where the fuse is series between the AC input power and the AC-DC converter. This allows the performance of the power supply to be more stable.

5) Each constant-current constant-voltage control unit may include a constant current control chip and a peripheral circuit, where the constant current control chip, in some embodiments of the present invention, is compatible with a large percentage (e.g., over 90%) of dimmers available on the market, and may therefore have wide applicability.

Figure 1:
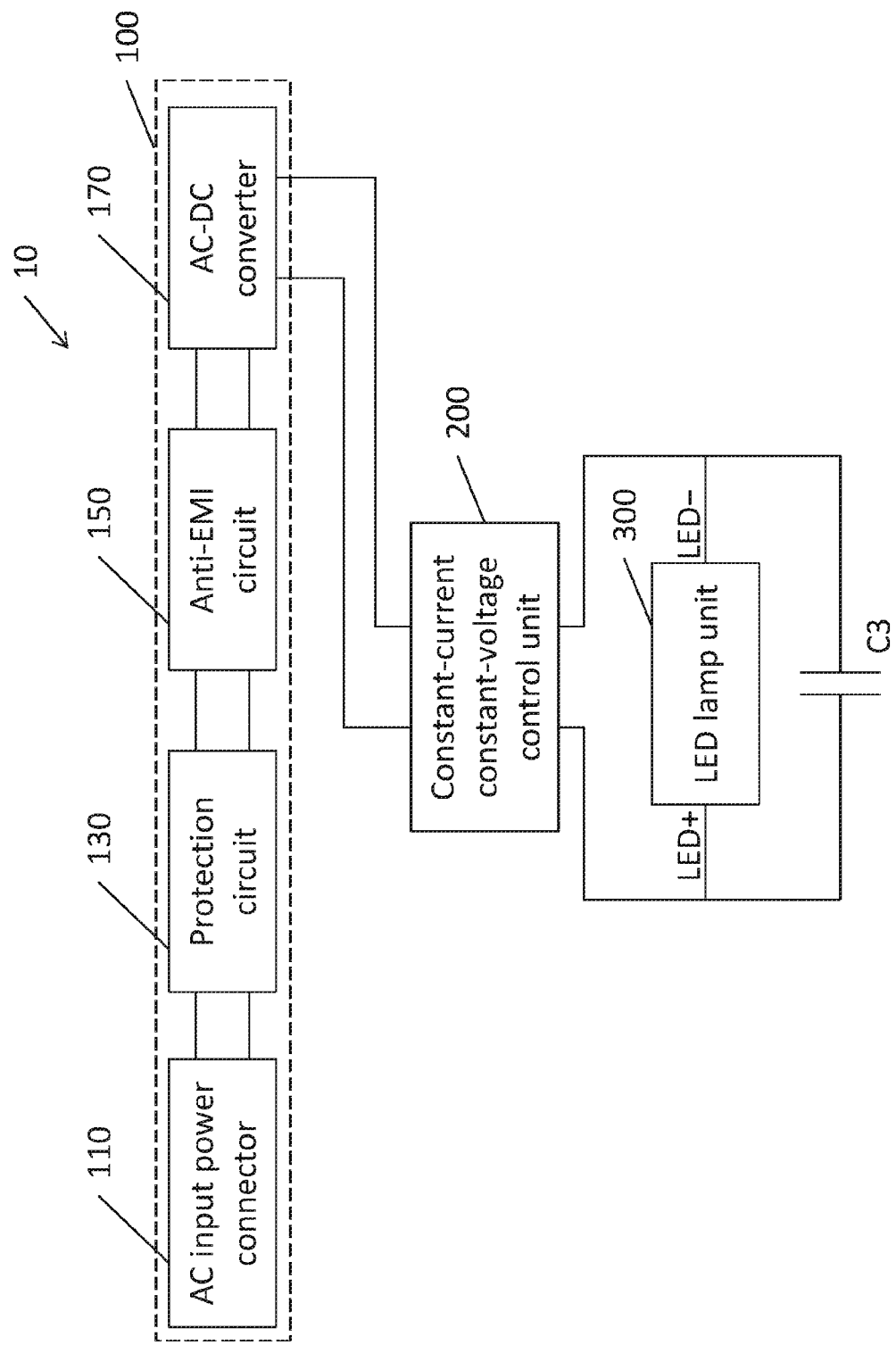
FIG. 1 is a block diagram of a power supply including one constant-current constant-voltage control unit according to one embodiment of the present invention.
Figure 2:
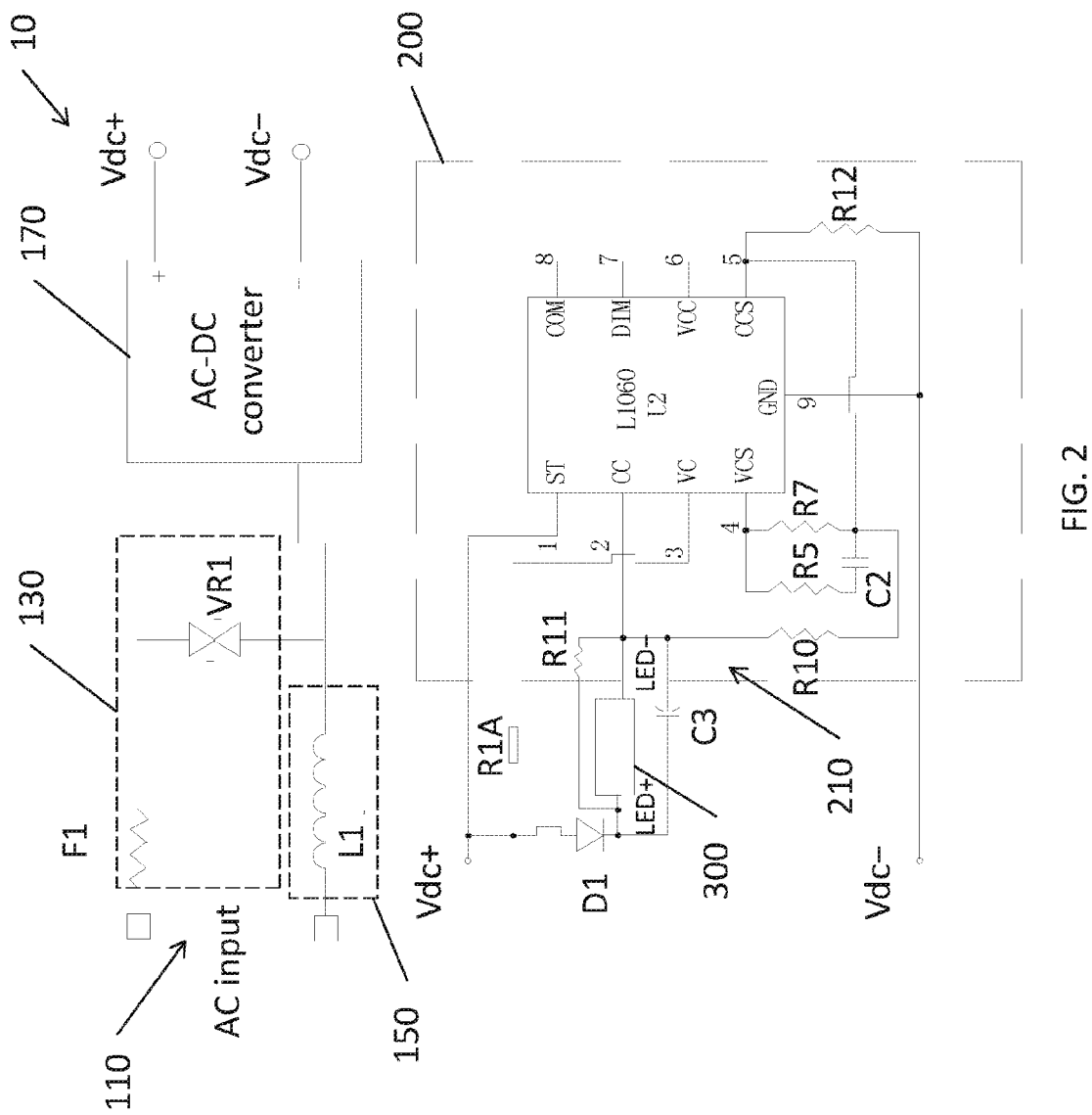
FIG. 2 is a circuit diagram illustrating a power supply including one constant-current constant-voltage control unit in accordance with one embodiment of the present invention.
Figure 5:
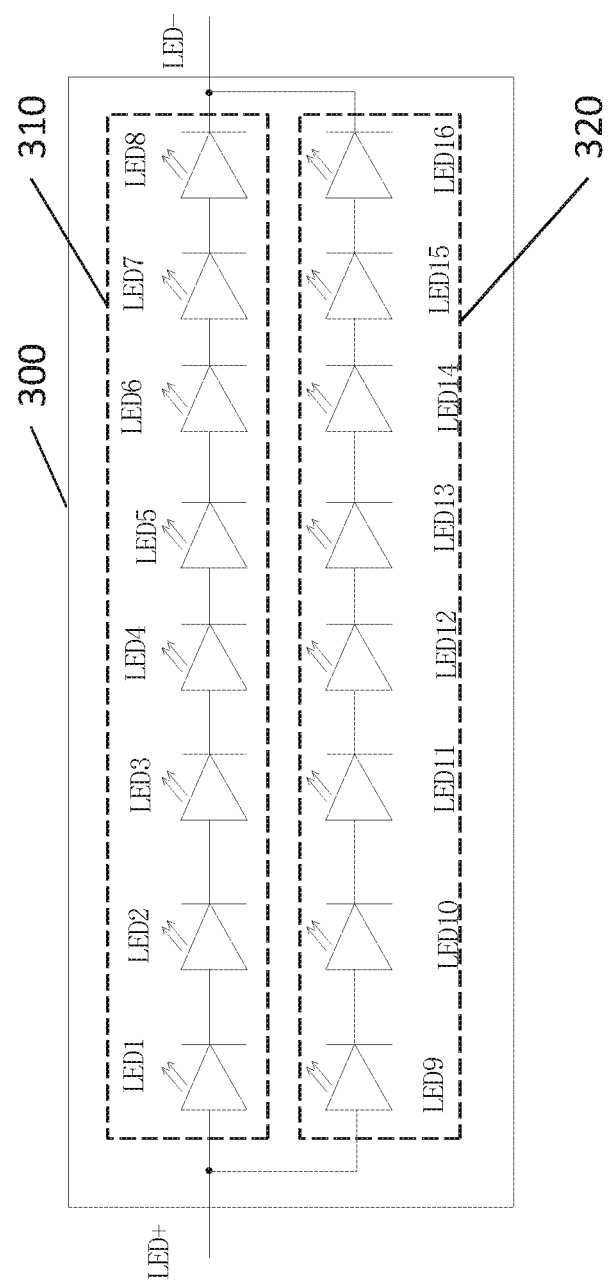
FIG. 5 is a circuit diagram of an LED lamp unit according to one embodiment of the present invention.
Figure 2:
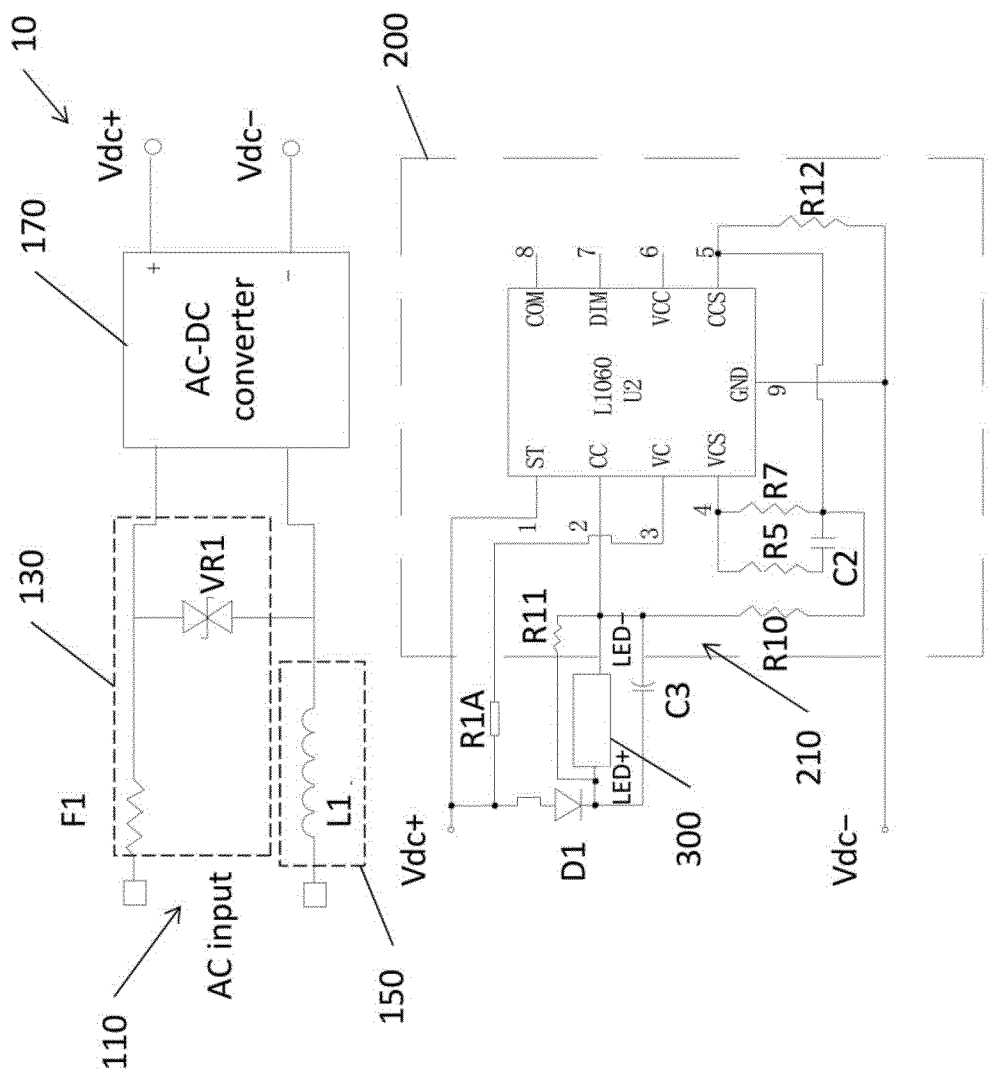
Figure 4:
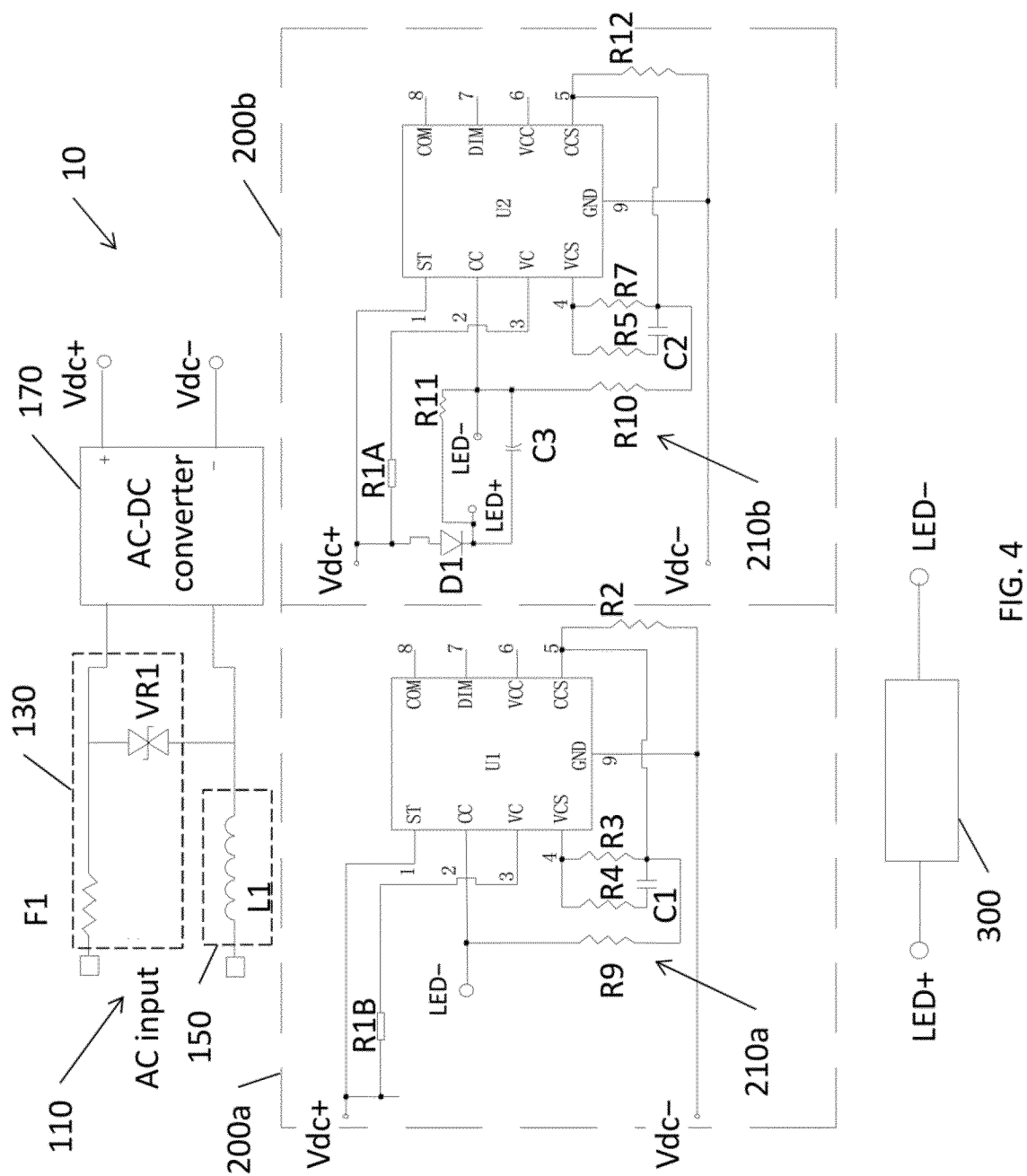

According to one embodiment shown in FIGS. 1, 2, and 5, a power supply 10 includes an AC-DC converter circuit 100, a constant-current constant-voltage control unit 200, and an LED lamp unit 300. The AC-DC converter circuit 100 includes an AC input power connector 110 having two input terminals and two output terminals. AC power (e.g., from an electrical grid) is supplied via the two input terminals to the AC input power connector 110 and the AC power is supplied via the two output terminals to the AC-DC converter 170. The AC-DC converter 170 has two input terminal coupled to the two output terminals of the AC power connector 110 and two output terminals coupled to the constant-current constant voltage control unit 200. The AC-DC converter 170 is configured to supply DC power via its two output terminals (Vdc+ and Vdc−) to the constant-current constant-voltage control unit 200. The constant-current constant-voltage control unit 200 includes two output terminals LED+ and LED− coupled to the LED lamp unit 300 and configured to supply driving signals to drive the LED lamp unit 300. The LED lamp unit 300 is coupled to the constant-current constant-voltage control unit 200 in parallel with capacitor C3. The capacitor C3 may have a capacitance of up to 33 μF. As shown in FIG. 2, in some embodiments, the capacitor C3 is an electrolytic capacitor.

According to one embodiment of the present invention, an anti-electromagnetic interference circuit 150 is located between an AC input power connector 110 and the AC-DC converter 170. The anti-electromagnetic interference circuit 150 is an electromagnetic compatibility (EMC) or other circuit for reducing electromagnetic interference (EMI). In the embodiment shown in FIG. 2, the anti-electromagnetic interference circuit 150 includes an inductor L1 coupled in series between one of the output terminals of the AC input power connector 110 and one of the input terminals of the AC-DC converter 170. In addition, as shown in FIG. 2, the outputs of the AC-DC converter 170 are positive and negative DC voltages Vdc+ and Vdc−.

The constant-current constant-voltage control unit 200 includes a constant-current constant-voltage control chip U2 (e.g., a controller with dual control loops to perform constant voltage and constant current regulation) and a peripheral circuit 210, where the peripheral circuit 210 includes a resistor R1A, resistor R12, the resistor R11, the resistor R10, the resistor R5, resistor R7, capacitor C2, and output terminals LED+ and LED−. In addition, as shown in FIG. 2, the LED lamp unit 300 is configured to be connected to the output terminals LED+ and LED− of the constant-current constant-voltage control unit 200.

The LED lamp unit 300 may include a string of LED lights 310 coupled in series. In addition, the LED lamp unit 300 may include one or more strings of LED lights 310 and 320 connected in parallel (see, e.g., FIG. 5), each string of LED lights including a plurality of LED lights connected in series. For example, as shown in FIG. 5, the first string of LED lights 310 includes LED1, LED2, LED3, LED4, LED5, LED6, LED7, and LED8, and the second string of LED lights 320 includes LED9, LED10, LED11, LED12, LED13, LED14, LED15, and LED16. The AC input power connector 110 may receive power from the electrical grid (e.g., mains electric power), which may be, for example, 120 VAC or 220 VAC, depending on the characteristics of the local grid power.

In some embodiments of the present invention, a protection circuit 130 is located between the AC input power connector 110 and the AC-DC converter circuit 170. The protection circuit 130 includes a fuse F1 and a voltage dependent resistor VR1, where the voltage dependent resistor VR1 is connected to both of the input terminals of the AC input power connector 110. The fuse F1 of the protection circuit 130 is connected in series between one of the terminals of the AC input power connector 110 and one of the input terminals of the AC-DC converter 170, such that, when the current is too large, the fuse F1 is tripped and breaks the electrical connection, thereby protecting the power supply 10. In addition, the voltage dependent resistor VR1 of the protection circuit 130 automatically decreases its resistance value in an overvoltage condition, thereby protecting the power supply 10 during high voltage conditions.

As such, according to one embodiment of the present invention, a power supply 10 for an LED lamp unit 300 may have a simple, low cost, and easy to implement structure that includes a capacitor C3 coupled in parallel with the LED lamp unit 300, where the power factor PF value exceeds 0.9 and may exhibit a low flicker amount of 30% or less.

Figure 3:
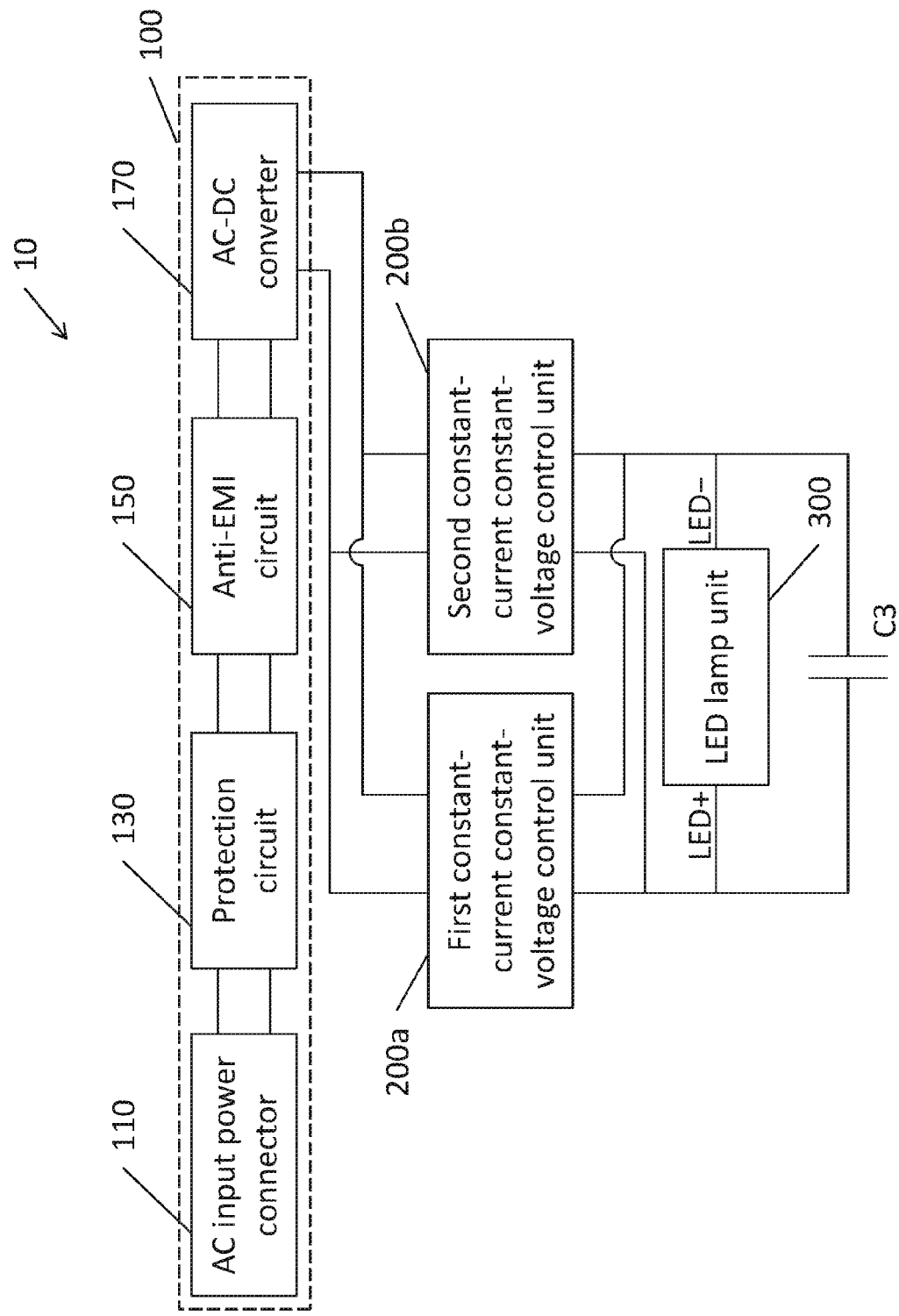
FIG. 3 is a block diagram of a power supply including two constant-current constant-voltage control units according to one embodiment of the present invention.
Figure 4:
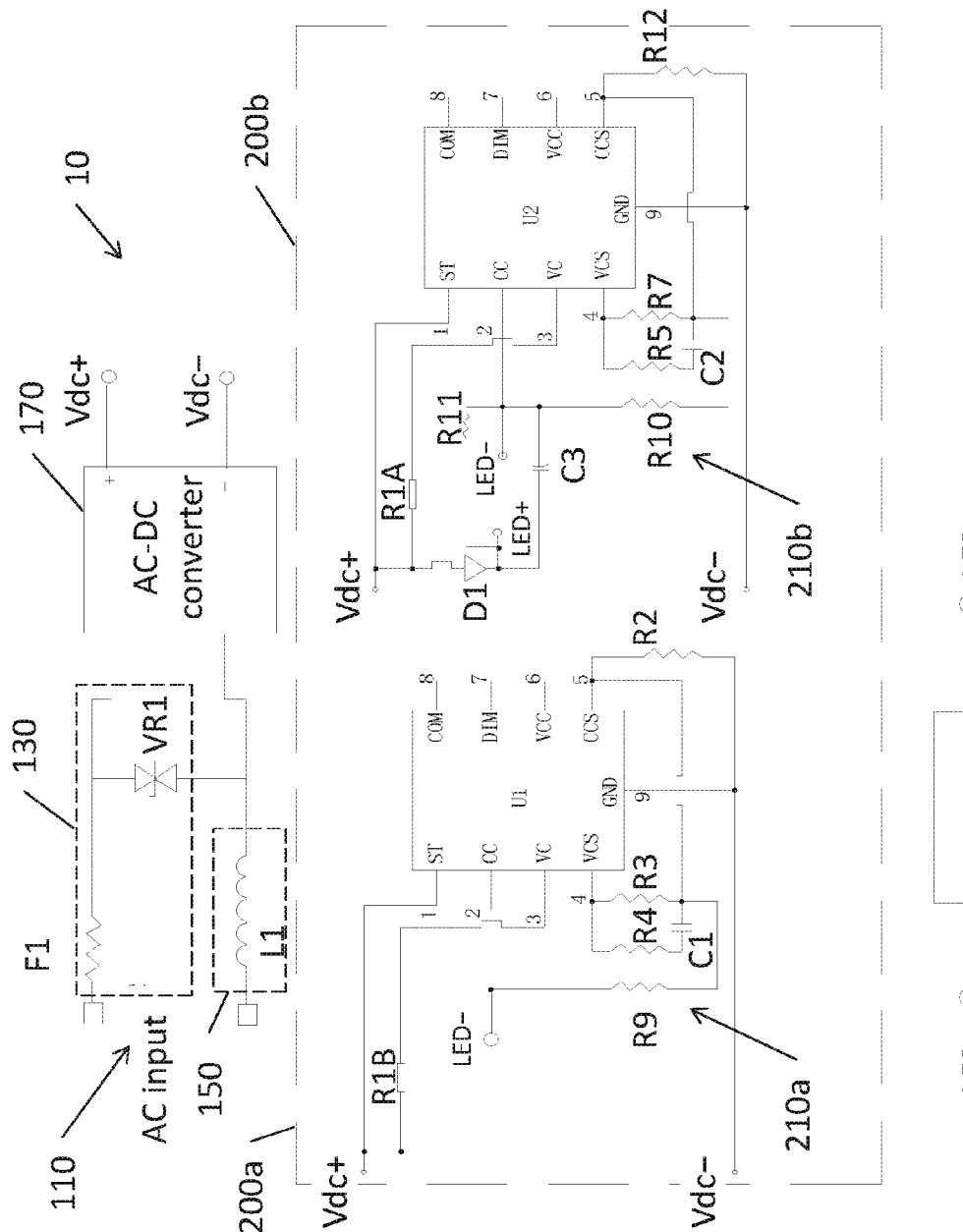
FIG. 4 is a concrete circuit diagram a power supply including two constant-current constant-voltage control units according to one embodiment of the present invention.

FIGS. 3, 4, and 5 illustrate another embodiment of the present invention, in which a power supply 10 includes an AC-DC converter circuit 100, a plurality of constant-current constant-voltage control units 200, an LED lamp unit 300. AC power is supplied from the AC input power connector 110 to the AC-DC converter 170, which supplies DC power to the constant-current constant-voltage control units 200. The constant-current constant-voltage control units 200 are configured to supply power to the LED lamp unit 300, and the LED lamp unit 300 may be coupled in parallel with one or more capacitors C3. In one embodiment, the constant-current constant-voltage control units 200 include two constant current control units coupled in parallel, respectively, a first constant current control unit 200a and a second constant current control unit 200b. Using two constant-current constant-voltage control units 200, the output power can be increased. For example, the driving power of the LED lamp 300 can be increased to 12 W (whereas a single constant-current constant-voltage control unit may be limited to driving 3 W-5 W LED lights). In some embodiments of the present invention, a separate constant-current constant-voltage control unit is used for each separate string of LED lights in the LED lamp unit 300. For example, in the embodiment shown in FIG. 5, the LED lamp unit 300 includes a first string of LED lights 310 and a second string of LED lights 320, and this may be driven by the power supply 10 shown in FIG. 4, which includes two constant-current constant-voltage control units 200. In other embodiments of the present invention, the LED lamp unit 300 may include more than two strings of LED lights, and the power supply 10 may include a corresponding number of constant-current constant-voltage control units. For example, a power supply 10 configured to control an LED lamp unit 300 with four strings of LED lights coupled in parallel may include four constant-current constant-voltage control units 200 coupled in parallel.

In addition, through the use of two constant-current constant-voltage control units 200 in parallel, the capacitance is more evenly distributed. The capacitance values of the capacitors C3 coupled in parallel with the LED lamp unit 300 can be increased to a value in the range of 33 µF-68 µF, thereby allowing flicker to be reduced further. As shown in FIG. 4, in some embodiments, the capacitors C3 may be electrolytic capacitors.

As shown in FIG. 3, the power supply 10 may include an anti-electromagnetic interference circuit 150 located between the input power connector 110 and the AC-DC converter 170. The anti-electromagnetic interference circuit 150 may be an EMC or EMI circuit, and, as shown in FIGS. 2 and 4, may include an anti-electromagnetic interference inductor L1.

As discussed above, the AC input power supplied to the AC input power connector 110 may be grid power (e.g., mains electric power), which can be, for example, 120 VAC or 220 VAC, depending on the characteristics of the local grid power.

In some embodiments of the present invention, a protection circuit 130 is located between the AC input power connector 110 and the AC-DC converter circuit 170. The protection circuit 130 of FIG. 4 is substantially similar to the protection circuit 130 of FIG. 2, and therefore description thereof will not be repeated herein.

Each of the constant-current constant-voltage control units 200 includes a constant current control chip U and peripheral circuit 210. The first constant-current constant-voltage control unit 210a includes a constant-current constant-voltage control chip U1 and a first peripheral circuit 210a, which includes a resistor the R1B, a resistor R2, a resistor R3, a resistor R4, a resistor R9, and a capacitor C1. The second constant-current constant-voltage control unit 20b includes a constant-current constant voltage control chip U2 and a second peripheral circuit 210b, which includes a resistor R1A, a resistor R12, a resistor R11, a resistor R10, a resistor R5, a resistor R7, and a capacitor C2. As shown in FIG. 4, the LED lamp unit 300 may be connected to both of the constant-current constant-voltage control units 200 at connection points LED+ and LED−.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A power supply comprising:
    an AC input power connector;
    an AC-DC converter circuit coupled to the AC input power connector;
    a constant-current constant-voltage control unit configured to receive DC power from the AC-DC converter circuit through a first input terminal and a second input terminal and to output power through a first output terminal and a second output terminal;
    a light emitting diode (LED) lamp unit configured to receive power from the constant-current constant-voltage control unit, the LED lamp unit being connected to the first output terminal and the second output terminal of the constant-current constant-voltage control unit; and
    a capacitor coupled in parallel with the LED lamp unit.

2. The power supply of claim 1, wherein the capacitor is an electrolytic capacitor.

3. The power supply of claim 1, wherein the capacitor has a capacitance value between 33 µF and 68 µF.

4. The power supply of claim 1, further comprising an anti-electromagnetic interference circuit coupled between the AC input power connector and the AC-DC converter circuit.

5. The power supply of claim 4, wherein the anti-electromagnetic interference circuit is an EMC or EMI circuit.

6. The power supply of claim 1, wherein the constant-current constant-voltage control unit comprises a constant-current constant-voltage control integrated circuit and a peripheral circuit.

7. The power supply of claim 1, wherein the AC input power connector is connected to grid power.

8. The power supply of claim 1, further comprising a protection circuit between the AC input power connector and the AC-DC converter circuit, the protection circuit comprising:
    a fuse connected in series between the AC input power connector and the AC-DC converter circuit; and
    a voltage dependent resistor connected between two input terminals of the AC input power connector.

9. The power supply of claim 1, wherein the LED lamp unit comprises a plurality of strings of LEDs in parallel, each of the strings of LEDs comprising a plurality of LEDs coupled in series.

10. A power supply comprising:
    an AC input power connector;
    an AC-DC converter circuit coupled to the AC input power connector;
    a constant-current constant-voltage control unit configured to receive DC power from the AC-DC converter circuit;
    a light emitting diode (LED) lamp unit configured to receive power from the constant-current constant-voltage control unit;
    a capacitor coupled in parallel with the LED lamp unit; and
    a second constant-current constant-voltage control unit configured to receive DC power from the AC-DC converter circuit and configured to supply power to the LED lamp unit in parallel with the constant-current constant-voltage control unit.

11. The power supply of claim 10, wherein the capacitor has a capacitance value between 33 µF and 68 µF.

* * * * *

UNITED STATES PATENT AND TRADEMARK OFFICE
CERTIFICATE OF CORRECTION

PATENT NO. : 9,900,937 B2
APPLICATION NO. : 15/249016
DATED : February 20, 2018
INVENTOR(S) : Shu Rong Ouyang It is certified that error appears in the above-identified patent and that said Letters Patent is hereby corrected as shown below:

In the Drawings

Please replace FIGS. 2 and 4 with FIGS. 2 and 4 as shown on the attached pages.

Signed and Sealed this
Eleventh Day of June, 2019

Andrei Iancu
*Director of the United States Patent and Trademark Office*